May 8, 1928.
C. P. CHAMBERLIN
1,669,228
AUTOMOBILE WINDSHIELD
Filed Dec. 1, 1924  2 Sheets-Sheet 2
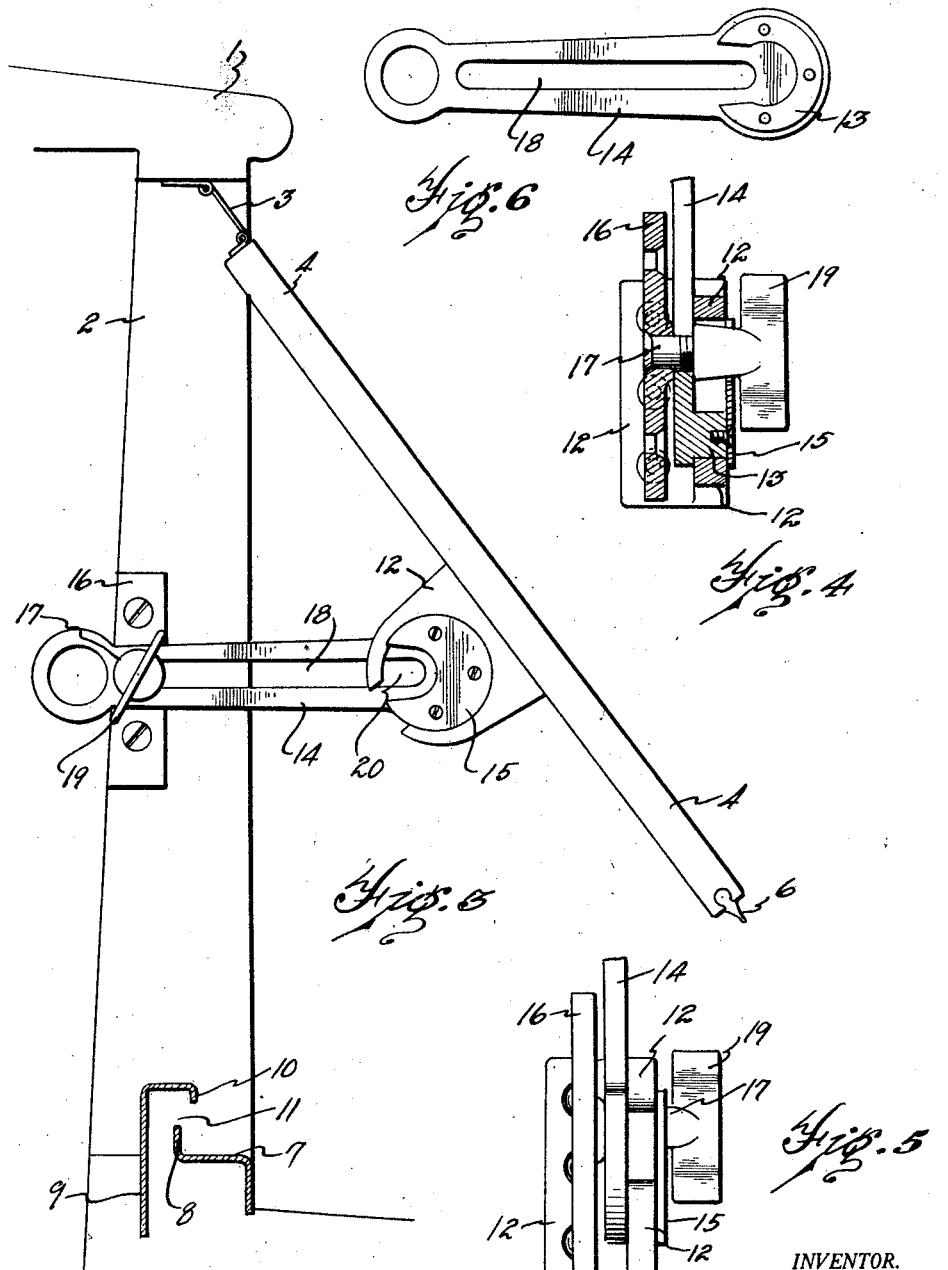
INVENTOR.
Clarence P. Chamberlin
BY
ATTORNEY.

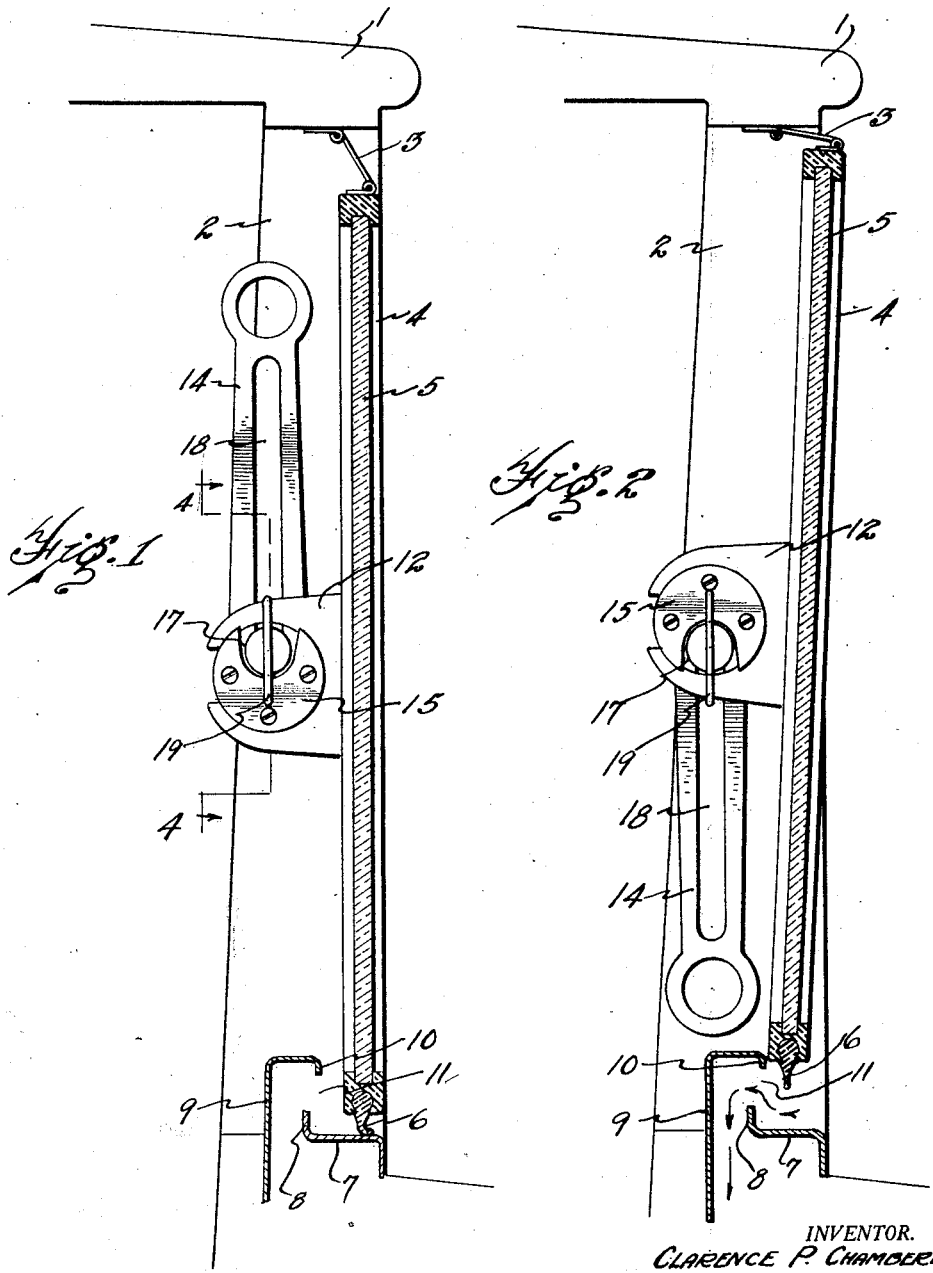

Patented May 8, 1928.

1,669,228

UNITED STATES PATENT OFFICE.

CLARENCE P. CHAMBERLIN, OF BIRMINGHAM, MICHIGAN.

AUTOMOBILE WINDSHIELD.

Application filed December 1, 1924. Serial No. 753,090.

This invention relates to automobile windshields and the object of the invention is to provide a windshield for automobiles which may be made of one piece and which may be adjusted upwardly or downwardly in a vertical plane.

Another object of the invention is to provide a windshield in which a ventilator is incorporated whereby upward movement of the windshield opens the ventilator and downward movement of the windshield closes the ventilator.

One of the particular objects of this invention is to provide a one piece windshield of the new type which eliminates the break across the center of the windshield with the usual accompanying rubber weather strip and at the same time provides a windshield which incorporates a ventilator and in which the windshield may also be swung outwardly for greater ventilation.

These objects and the several novel features of the invention are hereinafter more fully described and claimed and the preferred form of construction by which these objects are attained is shown in the accompanying drawings in which—

Fig. 1 is a section through an automobile windshield embodying my invention, in the closed position.

Fig. 2 is a section through the windshield in position to open the ventilator.

Fig. 3 is a section through the windshield swung to full open position.

Fig. 4 is an enlarged section taken on line 4—4 of Fig. 1.

Fig. 5 is an elevation of the parts shown in Fig. 4.

Fig. 6 is a view of the adjusting arm.

As shown in Fig. 3 the closed automobile body 1 is provided with a windshield opening 2. Secured to the automobile body 1 at the upper edge of the opening 2 is a three flap hinge, one outside flap being attached to the body 1 and the other outside flap being attached to the windshield frame 4. The windshield frame 4 contains a one piece glass windshield 5 and the lower edge of the frame 5 carries a rubber strip 6. The rubber strip 6 normally seats on a sheet metal member 7 which extends across the bottom of the windshield opening and is provided with an upturned edge 8. A sheet metal member 9 also extends across the bottom of the windshield opening and is provided with a downwardly turned edge 10 spaced from the edge 8 of the member 7. This provides a horizontal opening 11 through which air may enter the automobile body when the windshield is raised to the position shown in Fig. 2. The member 9 may continue downwardly and form the instrument board of the automobile or a separate instrument board may be provided if desired, the air being directed downwardly beneath the instrument board as indicated by the arrows shown in Fig. 2. Secured to each side of the windshield frame 4 is a bracket 12 having an opening for receiving the C shaped portion 13 of an arm 14 shown in Fig. 6. This portion 13 as shown in Fig. 4 is inserted in the opening in the bracket 12 and a plate 15 is secured to the portion 13 and overlaps the upper edge of the opening in the bracket 12 as shown in Figs. 1, 2, 3 and 4. By this arrangement the arm 14 may turn freely in the bracket 12. A plate 16 is secured in each side of the windshield opening 2 and a set screw 17 is inserted through the slot 18 in the arm 14 and is threaded into the plate 16, the set screw 17 being provided with a wing end 19 for this purpose. By this arrangement the two arms 14 on opposite sides of the windshield opening 2 may be pushed outwardly and bindingly secured in place by the set screw 17 at which time the windshield will be in the position shown in Fig. 3. To close the windshield the set screws 17 are loosened and the windshield is moved inwardly until the set screws engage in the ends 20 of the slots 18 within the opening in the brackets 12. It will be noted that in this position the set screws 17 are eccentric to the center of the openings in the brackets 12 and as the set screws 17 form stationary pivots for the arms 14 upward movement of the arms 14 at this time will move the brackets 12 and windshield downwardly so that the windshield opening is entirely closed as shown in Fig. 1. By turning the arms 14 from the position shown in Fig. 1 to that shown in Fig. 2 the members 13 shown in Fig. 6 are turned on the pivots 17 thus raising the brackets 12 and windshield to the position shown in Fig. 2 the double pivot hinge 3 allowing this movement and at the same time closing the space over the top of the windshield. In this position the windshield is raised so that air may enter the opening 11 for ventilating the interior of the closed automobile body and as this opening extends across the width of the windshield considerable ventilation may be produced in this manner. By this construction the windshield and ventilator may be tightly closed as shown in Fig. 1, may be opened slightly for ventilation as shown in Fig. 2 or may be entirely opened as shown in Fig. 3 for greater ventilation, there being also considerable flow of air through the opening 11 at this time.

From the foregoing description it becomes evident that the device is very simple and efficient in operation, provides an excellent means for ventilating a closed automobile body, is composed of few parts and is of consequent low manufacturing cost, and provides a device which accomplishes the objects described.

Having thus fully described my invention, what I claim is—

1. An automobile windshield comprising a rectangular frame, a three flap hinge securing the frame to the upper edge of the windshield opening of a closed automobile body, a bracket on each side of the frame, an arm rotatably mounted in each bracket and provided with a longitudinal slot, a pin mounted each side of the casing and extending into the slot of the respective arm and on which the arm may pivot, a rubber strip across the bottom of the windshield frame, a pair of members across the bottom of the windshield opening mounted in spaced relation, and means whereby the arms may be turned to raise the windshield to expose the opening between the two spaced members.

2. An automobile windshield comprising a rectangular frame, a bracket secured to each side of the frame, an arm rotatably mounted in each bracket, a stationary pivot for each arm, the arms being slidable on the pivots, and means whereby turning of the arms on the pivots moves the windshield upwardly or downwardly.

3. An automobile windshield comprising an automobile body having a windshield opening, a windshield frame movably mounted in the opening, a stationary pivot at each side of the opening, an arm slidable on each pivot, a bracket on the windshield frame for each arm in which the arm is rotatably mounted, the arms being turnable on the pivots to raise or lower the windshield, means closing the space between the top of the windshield frame and the windshield opening, and a ventilator adapted to be opened upon upward movement of the windshield frame.

4. An automobile windshield comprising a rectangular frame, a bracket secured to each side of the frame, an arm rotatably mounted in each bracket, a stationary pivot for each arm at the side of the windshield, the arms being slidable on the pivots to swing the windshield frame outwardly, and means whereby when the windshield frame has been swung inwardly the arms may be turned on the pivots to raise or lower the windshield frame.

In testimony whereof I sign this specification.

CLARENCE P. CHAMBERLIN.